United States Patent
Reich

(10) Patent No.: US 7,400,950 B2
(45) Date of Patent: Jul. 15, 2008

(54) OPTICAL SENSING SYSTEM AND SYSTEM FOR STABILIZING MACHINE-CONTROLLABLE VEHICLES

(76) Inventor: Stefan Reich, Moosrain 47, 82418 Murnau (DE)

(*) Notice: Subject to any disclaimer, the term of this patent is extended or adjusted under 35 U.S.C. 154(b) by 701 days.

(21) Appl. No.: 11/085,317

(22) Filed: Mar. 21, 2005

(65) Prior Publication Data
US 2005/0165517 A1    Jul. 28, 2005

Related U.S. Application Data

(63) Continuation of application No. PCT/IB03/004126, filed on Sep. 23, 2003.

(30) Foreign Application Priority Data

Sep. 23, 2002 (DE) ............... 102 44 313
Nov. 30, 2002 (DE) ............... 102 56 202
Dec. 14, 2002 (DE) ............... 102 58 545

(51) Int. Cl.
*G01C 23/00*    (2006.01)
(52) U.S. Cl. .................. 701/3; 701/4; 701/223
(58) Field of Classification Search ............ 701/1, 701/3, 4, 12, 14, 36, 200, 220, 223; 244/75.1, 244/175, 194
See application file for complete search history.

(56) References Cited

U.S. PATENT DOCUMENTS

| | | |
|---|---|---|
| 4,605,308 A | 8/1986 | Hankel et al. |
| 4,671,650 A | 6/1987 | Hirzel et al. |
| 4,880,967 A | 11/1989 | Kwang-Chien |
| 5,072,396 A | 12/1991 | Fitzpatrick et al. |
| 5,644,139 A | 7/1997 | Allen et al. |
| 5,703,356 A | 12/1997 | Bidiville et al. |

(Continued)

FOREIGN PATENT DOCUMENTS

DE    41 08 889 A1    9/1992

(Continued)

OTHER PUBLICATIONS

Agilent Technologies, Optical Mouse Points to the Future, 2001, pp. 1-3.

(Continued)

*Primary Examiner*—Richard M. Camby
(74) *Attorney, Agent, or Firm*—Fattibene and Fattibene; Paul A. Fattibene; Arthur T. Fattibene

(57) ABSTRACT

In order to measure the movement of a vehicle, especially an aircraft, an imaging optical system 2 which is to be positioned on the vehicle is used to detect an image of the environment 4, and an optoelectronic shift sensor 3 chip of the type comprising an inherent evaluation unit is used to measure any shift of the image from structures thereof. The shift sensor is equal or similar to the sensor used on an optical mouse. The sensor is positioned in such a way that infinite objects are focused. The measuring signal is evaluated to indicate movements and/or the position of the aircraft. The inventive system can also be used to measure distances e.g. in order to control the flight altitude. The invention further relates to methods for automatically controlling particularly a hovering flight by means of a control loop using optical flow measurement.

19 Claims, 4 Drawing Sheets

U.S. PATENT DOCUMENTS

| | | | |
|---|---|---|---|
| 5,716,032 A * | 2/1998 | McIngvale | 244/185 |
| 5,738,300 A | 4/1998 | Durand | |
| 6,021,980 A | 2/2000 | Wright et al. | |
| 6,181,989 B1 | 1/2001 | Gwozdecki | 701/4 |
| 6,265,725 B1 | 7/2001 | Moll et al. | |
| 6,568,777 B1 | 5/2003 | Anderson et al. | |
| 6,599,042 B2 | 7/2003 | Wolf | 400/582 |
| 2003/0075674 A1 | 4/2003 | Anderson et al. | |

FOREIGN PATENT DOCUMENTS

| | | |
|---|---|---|
| DE | 41 24 654 A1 | 1/1993 |
| DE | 197 13 945 A1 | 10/1997 |
| DE | 693 10 695 T2 | 1/1998 |
| DE | 198 35 809 A1 | 2/2000 |
| DE | 199 47 023 A1 | 5/2001 |
| DE | 199 50 060 C2 | 5/2001 |
| DE | 101 49 272 A1 | 7/2002 |
| DE | 195 20 242 C2 | 7/2002 |
| DE | 199 07 546 C2 | 2/2003 |
| EP | 0 631 109 B1 | 12/1994 |
| EP | 0 780 807 A1 | 6/1997 |
| EP | 0 942 285 B1 | 12/2002 |
| FR | 2 431 705 | 2/1980 |
| GB | 2 041 689 A | 9/1980 |
| GB | 2 152 319 A | 7/1985 |
| JP | 10-328427 | 12/1998 |
| WO | WO 02/03369 A1 | 1/2002 |
| WO | WO 03/067351 A2 | 8/2003 |
| WO | WO 2004/025386 A1 | 3/2004 |

OTHER PUBLICATIONS

Jan Grecner, Navigator-1, 2001, pp. 1-6.

* cited by examiner

OPTICAL SENSING SYSTEM AND SYSTEM FOR STABILIZING MACHINE-CONTROLLABLE VEHICLES

RELATED APPLICATION

This is a continuation of International Application PCT/IB203/004126, with an international filing date of Sep. 23, 2003.

FIELD OF THE INVENTION

The invention relates to an apparatus and a process for measuring motion-related measurands like velocity and/or position of a machine-controllable vehicle in at least one of its six degrees of freedom, wherein the term "vehicle" may include airbone objects, using optical sensor technology; furthermore especially a use as stabilising system for controlling unmanned or manned airborne objects. The purpose of such a stabilising is to substantially simplify or to completely take over the control.

Such stabilising is especially important for remote controlled helicopters, since their control is difficult, and only possible by trained pilots. In case of the helicopter, the control may especially include one or both horizontal components of flight motion.

A further possible field of application of the invention is the simplification of the control of manned aircrafts, especially in ground proximity and while landing. Further embodiments imply further applications, such as distance measurement, scanning of a terrestrial altitude relief, coordination of the flight movement of several airborne object among each other.

BACKGROUND OF THE INVENTION

Conventional remote controlled helicopters, as they are used for hobby purposes or for aerial photography purposes, possess as stabilising device merely a piezoelectric rotation sensor for stabilising motions about the yaw axis by means of the tail rotor, but not about the other axes.

DE 69502379 as well as JP 10328427 describe a regulating control for helicopters, wherein instruments for gravitational acceleration and for angular velocity are present, with which an artificial horizon is formed and the inclination of rotor blades is controlled.

U.S. Pat. No. 5,738,300 measures and controls, in addition to the above, the travelling speed with respect to air (air speed). A ground related control, and especially a stationary hovering, are not possible in all the mentioned cases.

RU 9300250 (Russia) and DE 69507168 describe stabilising systems, in which by means of several light sensors the direction of incoming light is measured and evaluated, in order to obtain an information about and to control the inclination, which may also include detecting approaching objects. Both said systems can only operate correctly in case of uniform illumination and a very even horizon.

EP 0780 807 describes an autopilot which uses conventional instrument s like gyroscopes and which stabilises the flight attitude and the horizontal speeds in a relative manner. However, an absolute measurement or regulation-control of absolute ground related position is not possible.

In order to control for example the flight path of a helicopter, for example to perform a stationary hovering, it is necessary to firstly control the inclination (i.e. roll and pitch angle), and secondly the resulting velocity, both by suitably driving the rotor blade controls. To this end, it is necessary that the inclination as well as the horizontal speed, preferably with respect to ground, are known. For an autonomous flight, it would not be sufficient to just counteract any inclination, because even in this case, the helicopter may not reduce a given speed on its own. Rather it has to be stopped by a well-dosed reverse inclination.

In this respect, the object of the invention is to measure horizontal movements with respect to ground, in order to be able to stabilise them.

DE 69426738 T2 describes a navigation system having an image sensor mounted on a gimbal-mounted table, the image data of which are analysed with respect to shift movements and are integrated to determine the position.

DE 3000654 A1 describes a similar device.

DE 693 10695 T2 describes an evaluation of an image obtained, in the flight position, by one or more cameras. Particular characteristic image portions are continually analysed with respect to their optical migration. Herefrom, a center of these movements, or vanishing point, is determined, and the detected shift speeds are analysed, weighted according to the distance from the vanishing point, whereby distances to the respective ground spots are calculated, for the purpose of navigation.

DE 690 12278 T2 compares presently taken images with a map of formerly stored images for recognition, also with the purpose of navigation. Furthermore it is explained (on page 7) that the optical shift of features, which cannot be correlated with a map, is measured from consecutive images to complete navigation.

FR 2 431 705 (THOMSON) and U.S. Pat. No. 4,671,650 describe devices for measuring velocity for planes using two lenses projecting two image sections of the ground—one towards the front in the direction of the flight and one towards the rear—onto two photodetection devices, whereby a video signal is generated by each photodetection device, both video signals are synchronised and compared with each other for time displacement by means of a delay measurement circuit and an autocorrelation method such that the velocity can be derived herefrom. The US document additionally measures the yawing angle.

All the five before mentioned methods require a complex image processing and at least one camera. The speed of measuring is limited by the framerate, which is inherent to the camera. With a video camera, this is of disadvantage for a fast attitude control, especially in case of small helicopters. For remote controlled lightweight airborne objects, such methods are of disadvantage because of their weight, the costs, and the limited scanning rate.

DE 41 24 654 A1 describes a method for measuring the orientation of a vehicle on a carriageway with an image forming system and a computerized image evaluation, wherein road parameters like curvature and width of the road are determined by means of recursive estimation methods.

DE 198 35 809 A1 describes a combined mouse for registering movement and simultaneously reading information, which uses a movement detector.

Further optical mouse devices for navigation on a computer screen and their respective shift sensors are described in DE 102 26 950 A1 and U.S. Pat. No. 5,644,139, wherein image structures which originate from a grained mat are being evaluated in one or more sensor arrays each containing a plurality of pixels and wherein the image shifts are acquired by correlation methods to determine the position on the mat. Due to their optical devices optical mice are suited for scanning microscopic structures of a surface, but not for flight movements, due to their small measurement range and the missing distance to the object.

DE 197 13 945 A1 describes a device for locating movable objects with a photodetector containing partial sensors arranged in rows whose collected signals are processed by image subtraction.

DE 32 29 343 A1 (BOSCH) describes a sensor on a similar basis for relative movements of a vehicle to a reference plain containing photodetectors in a grid structure to measure an image stream occurring due to the relative movement and hence the movement by means of optical structures of the ground. No evaluation circuit calculating shifts is provided, only luminance differences are amplified.

The two last-mentioned methods are based on the effect that a randomly distributed contrast structure results in signals with delayed phases when scanned with several stripe grids during movement. To get reproducible signals however, these system need structures which are randomly but sufficiently evenly spread.

A position measurement by satellite navigation (GPS) has the disadvantage that small movements, as they are important in ground proximity, cannot be detected with sufficient precision. Furthermore, due to weight reasons and cost reasons, the application in toy models is not reasonable.

Object of the invention is a measuring system of the mentioned kind, which operates without the mentioned disadvantages and which precisely detects movements and therefore is also applicable as a measuring device for a stabiliser, in particular is suited for providing actual values in conjunction with a stabiliser, and in particular for airborne objects remotely controlled from the ground.

As solution, the characterising features of the independent claim 1 are provided.

In a further aspect of the present invention it is a further object of the invention to provide a system for flight stabilization, which is particularly suited for hovering airborne objects like helicopters during hovering and which is particularly suited for roll movements and horizontal velocities implicit herewith.

For controlling the flight inclination of a helicopter a measurement value is needed. An inclination sensor based on gravitation and acceleration is not suited since a hovering helicopter always accelerates horizontally during inclinations, and therefore the measurement value of the inclination sensor is always neutrally showing downwards (in on-board coordinates), hence an inclination cannot be measure on board. Integrating the measurement value of an angular rate sensor (gyroscope) has the drawback that firstly unknown initial values occur through integration and secondly drifts are summed up over the time and distort the measurement value as described under FIG. 5 (paragraph 6).

The present invention allows for a precise inclination control, whereby a measurement value for the actual inclination is generated and used as actual value for a feedback control. Herewith, especially for hovering, flight inclination can by controlled automatically as well as in particular horizontal velocity and/or position above ground can be stabilized and held.

With regard to a flight stabilization or attitude control based on a ground-related optical shift measurement (also called optical flow), of all documents mentioned above corresponding state of the art is contained only in DE 693 10 695 T2. Here a control for evasion during rapid flight over obstacles is described, however, no stabilization or attitude control suited for hovering flight is contained. The other documents do not contain any evaluation of an optical image shift and/or relate only to measurement or navigation, but do not contain any open or closed loop control.

WO 2004/025386A1 describes a measurement with 2 angularly offset image sensors ("photo-capteurs") and time difference measurement. It needs 2 cameras and is comparable with FR 2 431 705 (THOMSON). It controls a horizontal forward velocity and a flight altitude by measuring a function of simultaneously altitude and velocity and by controlling lift and inclination. It is suited especially for forward flight movements. It is not suited for stabilization of hovering flight, since then no time difference would occur or could be measured; especially it is not suited for measuring or controlling a roll inclination.

WO 03/067351 A2 measures an angle between a light guide beam and the airborne object upon arrival on a light sensor, and controls the flight inclination herefrom. A guide beam light source is needed, which for example must be attached to a ceiling.

In DE 34 46 447 A1 a mirror attached to the ground reflects a guide beam sent from on board. Hovering of the helicopter is controlled by the arriving light of the reflected beam. However, the mirror must be deployed on that location. No image receiving means and no image evaluation are provided.

For solving this further object, the following are provided.

The optical imaging system may for example be a convex lens, a camera lens, a concave mirror or any image projecting group of lenses.

As the shift sensor, preferably an optical sensor may be employed having a number of photosensitive elements which is low compared to those of image acquisition devices and having an electronic evaluation circuit integrated on the same chip, the sensor being of the sort sometimes known as movement sensors and commonly used in optical mice. Hereinafter, the latter will be referred to as optical-mouse-sensors.

Such a shift sensor contains on a substrate a sensing area made up of a multitude of light sensitive partial areas (pixels), the signals of which are frequently read out, wherein the readout rate may be substantially higher than the frame rate of video cameras. Furthermore it contains on the same substrate an evaluation unit, in which the pixel signals are electronically analysed with respect to displacement. Usually, the displacement may be evaluated incrementally with respect to two orthogonal coordinates, and be outputted as separate values (delta x, delta y). The shift may be resolved in small steps, which for example may be equivalent to the pixel distance. The detection of the sensor may comprise both, the direction and the magnitude of the optical shift (translation).

Commonly used optical-mouse-sensors contain mostly 16×16 or 18×18 or a similar number of pixels in CCD-technology (charge coupled device), in order to recognise a displacement even when image structures of the mouse-pad are distributed at random and irregularly, as for example given by the microscopic fibres of a sheet of paper. The evaluation of the displacement value may be done in that the data of these pixels are continuously and frequently read out, and are correlated to those of a former moment in time of the same sequence, and thereby are compared with respect to their coordinates. The comparison may be carried out using the most recently read data, or using data from an earlier cycle of the same sequence. The data may be temporally correlated with respect to each other. The evaluation process may be carried out digitally program-controlled. It may employ a similarity algorithm. To this end, the individual pixel's luminance signals may at first be divided into few discrete steps of luminance, whereby the amount of information to be analysed is reduced. An adaptation to the average image brightness may be included, in that the shutter time is varied, and/or in that the pixels are analysed with regard to at least one shared reference value, which is adapted to the average brightness.

Methods of this kind allow the evaluation process to function correctly even if backgrounds or surroundings are of varying brightness.

Shift sensors, even if originally designated only for application in optical mice and for the navigation on computer screens, according to the present invention may advantageously be utilised as sensors, in that they are combined with the described optical means imaging remote objects. Thereby, their application for scanning of remote objects in free space is possible.

In most cases, the illumination of the objects may be achieved solely by use of the ambient light.

Further advantages of sensors having their light sensitive array and their electronic evaluation circuit on the same chip, particularly when using them in micro size aircraft, are their low costs, their low weight, and their high rate of evaluation, furthermore much less electric power consumption as compared to systems with video camera and discrete image evaluation.

As an advantage of a comparably small number of pixels, the fast scanning rate is to be mentioned, as compared to systems, which need a TV-camera or video camera. The smaller the aerial vehicle is, and thus the faster it reacts, the more important is the sampling rate, for a sufficiently fast working attitude control of aerial vehicles. By doing away with the high amount of data of a video signal, one benefits from a larger process speed, in return. The shift sensor may be operated with a clock frequency substantially lower than the clock frequency designated according to the data sheet. This allows for longer exposure times and thus a higher light sensitivity. When lowering the clock frequency to values of 75% to 10% (of its original), or even less, one still obtains a data rate substantially faster than in case of video cameras.

Contrary to the application of a shift sensor inside an optical mouse, the apparatus according to the present invention has to be designed for coverage of substantially larger and more distant objects. However, there might be provided a supplementary optical device in addition to the optical device used in an optical mouse, which is dimensioned in such a way that, in cooperation with the present lens, it will produce the imaging defined in the independent claim 1. This may be carried out, for example, by an additional concave lens, for example according to Barlow's principle, or by image projection into an intermediate image plane.

Advantageously, the imaging optical system may be focused to infinity, or even better to such a distance, from which, including the depth of sharpness, a range of sharpness from infinity to a shortest possible object distance results.

The focal length may be chosen according to the required angular resolution, based on the spatial resolution defined by the sensor. The choice of focal length may also take into account the obtainable depth of sharpness (range of depth of field) and the maximal measuring range with respect to velocities. A focal length suitable for application in remote controlled small helicopters is within the range of 7-25 mm, preferably about 10-12 mm. Thereby, a sufficient angular resolution, a sufficient velocity measurement range as well as a suitable depth of sharpness ranging from about 20 cm to infinity is obtained. Here, the term 'focal length' means the lens property, not its distance to the image plain.

The invention's combination of the imaging optical system 2 with a shift sensor 3, resulting in a sensor-unit 5, has a cone-shaped coverage range reaching to the free space outside the apparatus, whose angular width is defined by the size of the shift sensor's total light sensitive area and the focal length of the imaging optical system. Unlike systems which use imaging devices like video cameras, the descriptions which follow mostly neglect the angular width of the coverage range, and only consider the optical axis or main direction 11 of the imaging, hereinafter referred to as "line of sight".

According to the invention, structures and contrasts of the ambiance, of the ground, or of other distant objects are optically imaged onto the shift sensor. Generally, the textures required by the described shift sensor, in order to detect a shift, may origin from any kind of contrasts, which are featured by a part of the surrounding or the terrain, due to surface textures, details, contours, or similar features. These may for example stem from the borders of distinct objects, or by optical roughnesses on its surface, similar to the operation of an optical mouse. Almost all visible structures, which usually occur in an image of the ground, contain enough such contrasts, structures and texture, so that the described shift sensor may detect an image translation also during flight. Exceptions are water surfaces, fog or continuous snow cover.

With the apparatus mounted at a vehicle, for example an airborne object, its movements become measurable, as is subsequently described in points a) to d) without being restricted hereto.

Generally, rotation (a) and translation (b) of the vehicle both can be measured, since both types of motion cause a migration of the direction of optical incidence of the virtual image into the imaging optical system.

Due to the imaging, incident angles are transformed into a proportional image shift on the shift sensor, and thus may be measured. Thereby, the focal length of the imaging optical system is the proportionality factor.

Depending on the arrangement and design of the present invention, different measurands of position and orientation of the vehicle may be measured:

a) For measuring rotations of the vehicle, for example roll, pitch and/or yaw, the sensor device is mounted in such a way that the line of sight, or at least a vector component thereof, is directed transverse to the rotational axis, and in the sensor the image shift is measured along the component orthogonal to the rotation axis. For stabilising flight movements or for avoiding undesirable fluctuations, a closed loop control may be established, in addition, by utilising the measured value for the generation of a control value, by an actual-value-versus-target-value-comparison, and the control signal being transferred to the relevant steering device to effect the correction. For stabilising the heading, a suitable arrangement is aslant forward-downward and/or backward-downward.

Furthermore, by scanning the direction of a target, a tracking may be achieved. To this end, a closed loop as described is provided. The control value can effect a tracking, in that it controls the alignment direction, or, as a result of this alignment, also directs the course towards that target. In both cases, the alignment direction of the scanning device is affected by and is subject to a self-regulated loop. This may be used for target tracking, even if the object is moving by itself. To this end, the line of sight is at first directed onto the target; this alignment is maintained by the regulation-control.

Another application is tracking the optical device by means of own servo-motors. This may be used for stabilising a camera for moving pictures and for photo. Advantageously, several types of disturbing movements may be stabilised: firstly, the wobbling movements of the vehicle or airborne object, respectively, secondly the image section's drift off caused by the drive, and thirdly a possible motion of the target object itself. Conventional gyroscope stabilisers may compensate only for the first kind of influences. Another advantage is, as described above, the substantially faster reaction of a shift sensor, as compared to the frame rate of the moving picture recording. The described apparatus may also be adapted for general use without being confined to a vehicle. In this respect, a sensor unit, equivalent to the apparatus according to claim 1, is mounted together with a camera onto a camera platform which is movable by servo motors, and the sensor-unit is moved along with the camera.

b) For measuring translation movements, the optical line of sight, at least with a vector component of it, is directed transverse to the direction of the motion to be measured. The amount of detected image shift is proportional to the distance travelled by the vehicle. The equivalent is applicable for the respective velocities. Furthermore, the image shift, according to the beam geometry, is inverse proportional to the distance along the line of sight, and proportional to the focal length, and proportional to the sine of the angle between movement direction and line of sight.

If only translations are to be measured, the rotational influences described under (a) may be disturbing. The optical measurement signal may be purged from these influences, in that a rotational signal, which represents the rotation, is combined by calculation with the shift sensor signal. The rotational signal can be obtained easily, for example by using another measuring instrument, for example a gyroscope. Depending on the polarity, the combining by calculation may consist of a subtraction, an addition, or generally speaking a mixture. Signals may have been treated beforehand, for example differenciated or integrated. This compensation method spares the gimbal mount for an optical receiver (the latter usually being a video camera there), used by the cited state-of-the-art.

For measuring horizontal flight movements of an airborne object, the line of sight may be fixed downwards with respect to the fuselage. Then, provided a normal attitude is present, the measurable direction of optical incidence of the detected ground textures deviates on account of the horizontal flight movement. Consequently, a closed loop control as described above, applied to horizontal motion values, allows for stabilising the horizontal movements, for example the ground speed or the position versus ground. In case of a helicopter, this can be used to horizontally stabilise the hovering flight, in that the cyclical rotor blade control is actuated.

As mentioned, the horizontal measurement value is inverse proportional to the viewing distance. In order to obtain a measurement value independent thereof, a distance-measuring instrument may be utilised, and the optical speed-measurement signal, after optionally having been purged from attitude influences, may be multiplied by a factor which is increasing continuously with increasing measured distance—at least in a sub-area of possible distance range. For measuring the distance, a microwave-radar or ultrasound-radar may be applied, as known in car backing collision sensors or from auto-focus cameras, or an optical distance sensor according to the light scanner principle, for example as described in DE 4004530. However, this altitude compensation may be omitted or carried out to a reduced extent only, for example, in case the measured value is used only for a stabilising loop control. In a helicopter, a hovering stabilisation was obtained using a PID-control-loop without altitude compensation, which, depending on loop-amplification-adjustments, worked very precise with any ground distances within a quotient ratio of 1:10, and still fairly well within a ratio of 1:30.

If this compensation is omitted, an advantage results in that the measurement is more sensitive and therefore the control works the more "firm" the lower the flight altitude is. Given a fixed target value for the (uncompensated) velocity, the real velocity will be automatically reduced in ground proximity. This behaviour has the additional effect that in the point of time, when the speed is reduced, due to the conversion of kinetic energy, a simultaneous upward movement is caused (except when tailwind is faster than groundspeed). Therefore, while horizontally cruising over ground elevations, a collision is avoided by instantaneous ascending. This behaviour may also be obtained with altitude compensation present, namely by delaying, with respect to time, the altitude signal used for compensation.

c) When the velocity is approximately known, a distance, for example, towards ground or towards an object may be measured as well. To this end, the optically measured signal is taken as the reciprocal value of the distance. For example, a known velocity may be divided by the optically measured speed value. If this value is used in a control loop, the division can be omitted, if the target value is already defined as a reciprocal value.

One application is the control of ground distance of airfoil planes. Since the horizontal speed is approximately known and usually more or less constant here, a measure for the present flight altitude above ground is obtained, even when flying over elevations. Thus, an early detection of approach is possible, and an avoiding of collisions with visible objects is possible. The flight altitude may be controlled or limited to a minimum ground distance. To this end, the line of sight may be adjusted aslant forward-downward, in order to obtain a temporal advance. Instead of with respect to the ground, distance may also be measured with regard to an object positioned there, forming for example an elevation.

d) Generally, movements may be measured in various different coordinates and be set into relation with respect to each other. In this way, mixed measurands may as well be separated from each other, as in the embodiments described below and in FIGS. 2 to 4. Furthermore, it is possible to measure distances and distance variations along a combined line of sight as well. This allows for a measuring of a climbing rate or a declining rate, respectively, or a recognition of approach.

Herein, the various measurands are generally called 'motion related measurands'. This is applicable for local as well as angular values. Motion related measurands may be of static type, as for example position, distance or attitude, and/or of dynamic type, as for example velocity and acceleration. Accordingly, the terms 'motion', 'rotation', 'translation', 'inclination' etc, are always used in a general sense here, i.e. for positional values as well as for their respective rates of change.

Motion related measurands may be measured with respect to the ground, or to ground related, moving or other flying objects. According to the invention, the output signal of the optical sensor, hereinafter referred to as 'sensor signal', may be utilised and evaluated in several ways, as described in the following. Optical mouse sensors for each of their two coordinates frequently have a quadrature output, delivering an incremental signal on 2 lines, wherein each shift is signalised, pursuant to its direction, as a step or a multitude of steps. Likewise, a serial data link or any other kind of signal transfer might be used for data output. Frequently, each data read-out gives out the number of steps of change, which occurred since the last readout.

Using appropriate evaluation, various information may be obtained, for example, but not limited to a) direction and velocity or angular velocity, respectively, of motion, i.e. alteration rates, b) the extent of motion, i.e. position values or angle values, c) acceleration values.

a) Alteration rates may be created by differentiating with respect to time. This conforms to a frequency measurement of the occurring incremental shift steps. To this end, in a sensor outputting the shift in form of distinct incremental steps, the frequency of these steps is measured, for example the frequency of the outputted quadrature-signals.

It is preferable if the velocity measurement value be produced continuously or at least quasi-continuously. For producing a suitable velocity measurement, within continuous time intervals, which may preferably be chosen to be small, the respective sum of occurring steps per interval including their sign is used, for example by a step-up/step-down-counting or by reading the sum changed since the last output, then dividing the respective obtained sum by the length of the interval. If intervals constantly have equal length, division may be omitted. Alternatively, for each step of change of the signal, the time span since the preceding step of change may be obtained, the reciprocal therefrom may be taken, and be provided with a sign corresponding to the direction of change.

In addition, the frequency value obtained in this way may be re-computed already prior to the arrival of the next alteration. To this end, after expiration of a period of time corresponding to the frequency, the frequency value is reduced, continuously or in steps, to become a value corresponding to the reciprocal of the presently expired waiting time, if the reciprocal is smaller than the last frequency value.

b) Position values may be created by up-counting/down-counting or summing of the incremental steps of the sensor signal, for example by counting the steps, corresponding to their directions, or integrating the increments, comparable with the usual operation of a computer mouse on a screen.

Alternatively, or in combination herewith, the position may be obtained by continuous integration of a frequency value with respect to time, which itself may be produced as explained above. This makes it possible that the above described compensation of the influences of other movements on the measurement may be compensated already prior to the integration process, thus the integrated results are obtained in already compensated form.

Depending on the embodiment, various measuring possibilities with respect to position measurement result as well. With the line of sight being directed downwards, a measure for ground related location measurement is obtained.

Using a measured value from the apparatus according to the invention, a control loop may be established, in which a measured value is utilised in a regulating controller 7 for generating a control value, which controls the movement. To this end, the methods known as PID may be used. Actual values may be any measured values generated according to the invention, i.e. velocity-related as well as position-related values, or a partial mix. Additionally, single or multiple integral and differential values may be produced and included. For example, a repeated differentiating of the frequency measurement value will provide a value for the acceleration. In addition, a PID-control may include the use of proportional, differentiated and/or integral portions of signals from other instruments on board, for example a piezo gyroscope.

Manually given control signals may be superposed to the regulating control circuit's output signal (control signal), so that the manual control is supplemented and stabilised. The manual control signals may also be included to the regulating control loop as a target value, for example by mixing them into the input, whereby a target-value-to-actual-value-comparison results, wherein the target value stems from the manual control signal. A detailed description of a regulating control circuit will follow, see the first embodiment and FIG. 5.

Concerning remotely controlled airborne objects, the parts needed for control may fly along (onboard), or may be disposed at ground and be connected by means of radio communication.

Instead of an optical mouse sensor, other optoelectronic devices may be used as shift sensor as well.

Especially in connection with the described attitude control, any method providing an output signal for optical flow, e.g. by means of evaluating a video image for current shifts, can be employed.

It is a further possibility that the shift sensor may comprise at least two adjacently disposed photoelectric light receivers, the distance of which, with respect to each other, corresponds to or about resembles an order of magnitude corresponding to the quarter of the wavelength of spatial frequencies numerously present in the image of ground structures. The moving of the optical structures induces phase-shifted alternating signals in the light receivers. These alternating signals are supplied/lead into a circuit, which analyses the temporal differences and/or phase differences. A circuit of this kind may be a time comparison circuit as it is used with direction-sensitive photoelectric relays or a phase comparison circuit. A circuit of this kind detects based on the phase position, which of the two signals hurries ahead of the other or drags behind the other, respectively, and thereby detects the direction of motion, and to a certain degree of precision, the velocity. Further, the circuit may correspond to an incremental analysis according to the quadrature principle, and therefore may be constructed in analog or digital manner. On the other hand, the measurement precision of such a device is usually smaller than that of a shift sensor provided with array and integrated analysing electronics, because the captured section of the ground structures is smaller.

The optical image may optionally be amplified by means of a residual light amplifier or another interposed optical device, before it reaches the shift sensor.

All signal processing operations and calculation operations described may be effected digitally, for example in a program-controlled microprocessor or may be realized in an analog circuit. Several of the partial methods, which are described here or are indicated in the claims may be combined to one combined process and/or may be carried out by one shared processor.

The described procedures may also operate with infrared light. Accordingly, the wording "sight", "light" and "image/imaging" always includes all optical types of radiation.

To be applied in darkness, the respective apparatus may be combined with a light source. Preferably, it radiates in a directed manner, and is directed towards the position to be sampled.

BRIEF DESCRIPTION OF THE DRAWINGS

In the following, the operation is further described with reference to embodiment examples.

DETAILED DESCRIPTION OF THE PREFERRED EMBODIMENTS

Figure 1:
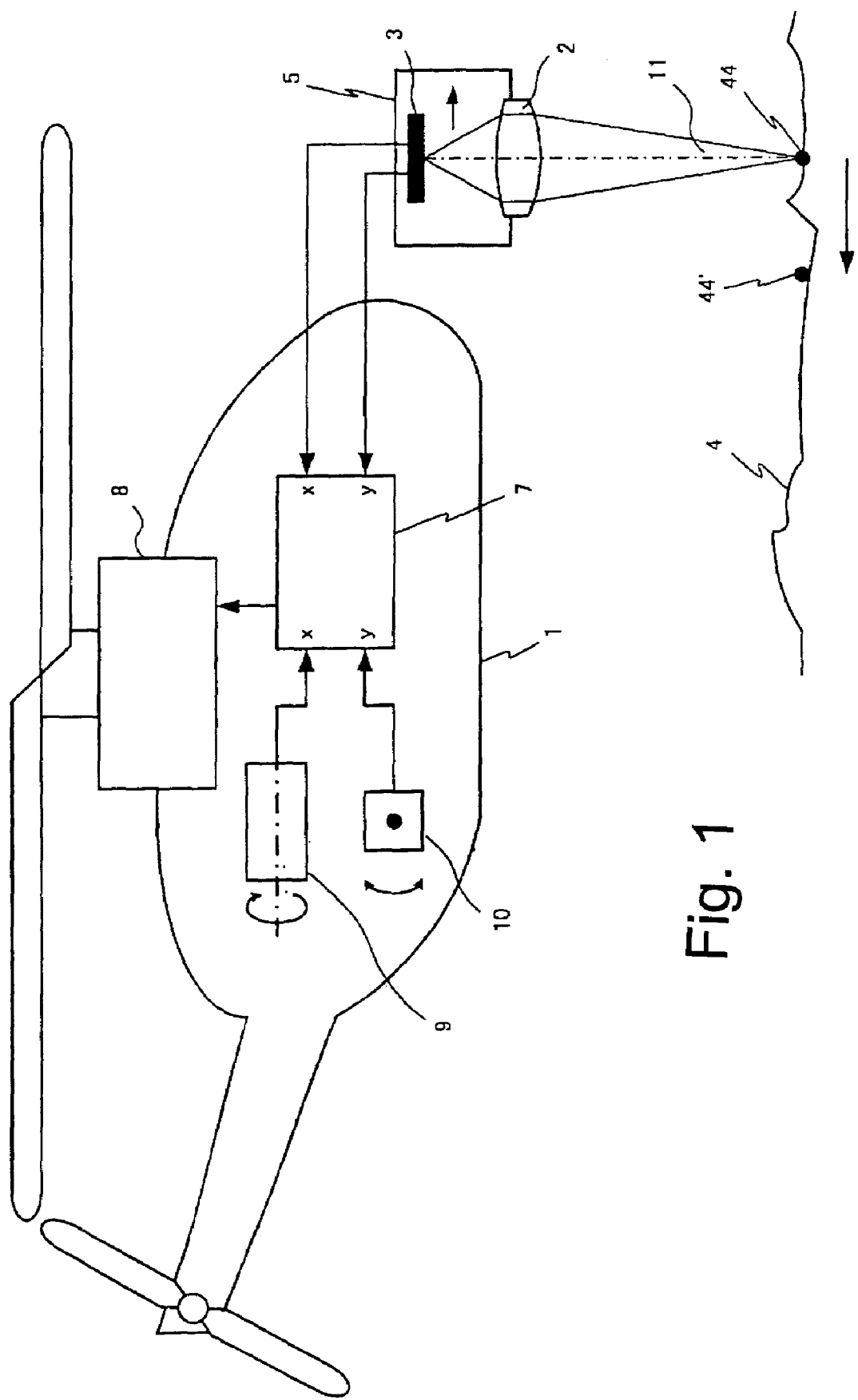
FIG. 1 shows a first embodiment example for stabilising a helicopter.

FIG. 1 shows a first embodiment example for measuring and stabilising the horizontal movements of a helicopter 1.

The lens 2 acts as objective lens and projects a visible section of the ground 4 onto the optical shift sensor 3 having an integrated analysing unit, on the same chip. During a forward movement, ground spot 44 migrates optically to the position 44', and accordingly, its image on the sensor 3 is shifted. The sensor outputs the incremental measurement values of the shift in two coordinates (x and y). If the line of sight, as indicated, is downwards, information concerning the flight velocity with respect to ground in both components forward direction and lateral direction is obtained.

These measurement values may be used for stabilising the flight path or a still-standing hovering flight. To this end, the feedback-control electronics 7 is, at its input side, connected to the optical measurement signals, and at its output side outputs control values for controlling the airborne object, wherein at least parts of the whole control are included, in this case the cyclic adjustment of rotor blades 8, for instance by means of a wobble plate controlling the inclination of the main rotor plane, and therefore influencing the horizontal acceleration of the helicopter. One example for the operation of a regulation-control 7 is described in detail further below, as well as in FIG. 5.

On the other hand, the measurement value does not only depend on the horizontal movement, but on rotational movements, which the airborne object might carry out simultaneously as well, as for example rolling and pitching. This influence is compensated by admixing a rotational signal. The rotational signal may for example be proportional to the angular velocity of the rotation, or to other rotational values as for example the angular position. Different possibilities for obtaining a rotational signal adapted for compensating are described in the following.

The rotational signal may be obtained by means of a gyroscope or a piezoelectric rotation sensor 9, 10 (piezo-gyro). Such additional measurement pick-ups may be provided at the airborne object or may be attached to or implemented into the apparatus 5 according to the invention. Since a piezo-gyro measures the angular velocity, the compensation is reasonably done by mixing the gyro-signal into a frequency signal obtained from the shift sensor, for example by differentiating, which already represents the velocity.

In case of a helicopter, a rotational signal may be created in that an acceleration sensor is moved together with the main rotor shaft, and is disposed at a distance from the rotor axis, wherein the acceleration component parallel to the rotor axis is measured, and the continuous measurement value is, as a function of the rotation of the rotor, cyclically analysed with respect to phase. As is the case with a gyroscope, rotations of the rotor plane induce precession forces that occur in the acceleration sensor as cyclically changing accelerations and are measured. The amplitude of the change is a measure for the angular velocity of the rotation to be measured. The phase position with respect to the rotors rotation is a measure for the direction of the rotation to be measured and for the orientation of the axis. The phase-related analysis may be carried out by creating a sampling sequence synchronised with respect to the rotors rotation, according to the clock-rate of which, the measurement signal is measured in an intersected way, or switched, for example in quadrants. Thereby, measurement values of the rotation are obtained divided into components, like for example the pitching axis and rolling axis. The synchronising may be effected by means of a rotary encoder, which samples the rotations of the rotor axle.

Preferably, the measured forces occur as cyclic changes. Therefore, the acceleration sensor does not need to be able to measure absolute values, but only the changes. Therefore, as acceleration sensor, a budget-priced piezoelectric force converter may be used, the measurement value of which can only be coupled capacitively. Further, the advantage that zero point errors of the measurement value do not occur from the beginning onwards is the result, in that the measurement value is obtained in form of an amplitude. A signal transmission from the rotating sensor to the regulating control-device may occur by means of radio communication, optoelectric transducers, inductive signal coupling or sliding contact. Even without optical measurement, this measurement procedure may generally be applied for stabilising a rotary wing airplane, the inclination of which is regulation-controlled depending on a measurement value. To this end, it is sufficient, if an acceleration sensor is moved along with the main rotor axle, and is disposed at a distance to the rotor axis, and if the acceleration component parallel to the rotor axis is measured, and the continuous measurement value is cyclically analysed with respect to phase, according to the rotor's position, and synchronous therewith.

To obtain a rotational signal for compensating the rotational influences without using a separate sensor, a control signal may be used as rotational signal, the control signal being supplied to a control means controlling the respective rotation, for example the servo signal of the wobble plate's inclination. This works, because usually the airborne object responds with a roll or pitch rate quite precisely proportional to the actuation. Therefore, such a control signal provides a suitable measure for the angular velocity to be used as compensating rotational signal. At this, the compensation is done by mixing the control signal into the velocity signal obtained from the shift sensor, which may be obtained by frequency measurement. If the control signal itself is created by means of a regulation-control-loop according to the invention, the actual value of which includes the measurement signal to be compensated, the compensation conforms to an inverse mixing within the regulation-control-loop in form of a negative feedback from the control value to the actual value, reducing the loop amplification. In this case, with identical principle of operation, the compensating mixing-in of the rotational signal may be realised by the regulating control-loop simply having a respectively smaller amplification.

An alternative or combinable possibility to obtain a rotational signal is to use a second optical shift sensor for this purpose, which according to the invention works as rotational sensor, as described, and the line of sight of which is differently aligned with respect to the first sensor.

Figure 5:
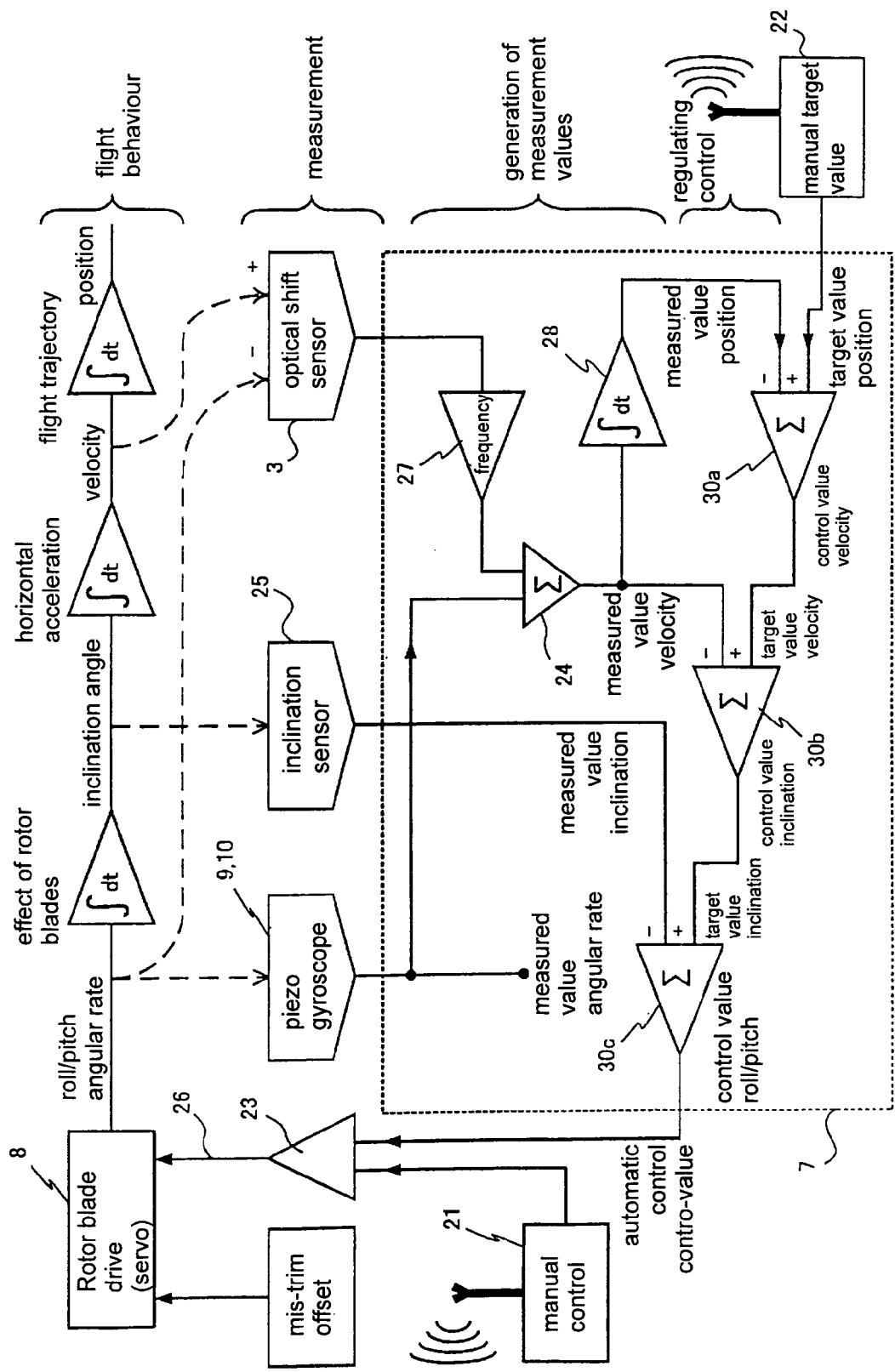
FIG. 5 shows a block diagram of a regulating control of the first embodiment example.

FIG. 5 shows, as an example, a block diagram of a regulation-control unit 7 for helicopter(s). The regulation-control loop may be constructed in the same way for the pitching axis and the rolling axis, and therefore is only shown once. During usual manual operation, control signals are supplied via the receiver 21 to the rotor blade control 24. The location reached in flight results from the flight response behaviour, which conforms to a series of several integrations with respect to time, as is shown in a self-explaining manner. The entirety of these motion related values represents the actual flight motion for each point in time. The influence of the movements onto the measurement is shown with dashed lines. Below the measurement instruments 9, 10, 25, 3, the operations of the regulation-control unit 7 are shown, divided into the representation of the measurands and the regulation-control itself, the control carrying out a comparison of actual value and target value.

From the signal of the shift sensor 3, at first a frequency 27 is obtained. The frequency may, as described, be purged from the influence of inclination and possibly flight altitude. This is done here by addition 24. The subsequent integration 28 may be a summation or a counting, and creates a position signal, in which the differentiating effect of the frequency measurement is reversed again.

A target value of the flight path or of the flight velocity be given. This may, for example, be a velocity vector or position vector, parameterised as a function of time. This function may be programmed prior to the flight, or may be pre-set during flight, or in the special case of the hovering flight may be zero (as velocity vector) or constant (as position vector), respectively. The present-time target-value is evoked, for example by means of the radio communication receiver 22, and is compared to the optical measurement value by subtraction 30a. The acquired difference corresponds to the momentary deviation from the target route (in 30a) or target velocity, respectively. In the (drawn) case of a target value for the required position vector, the regulation may occur in that at first the positional deviation 30a is defined as a control value for a flight-back velocity, and in that this velocity itself is regulation-controlled 30b. According to the PID method, a mixture from positional measurement values and velocity measurement values may be regulation-controlled together.

Proportionally and reverse to the deviation of the velocity, an inclination control value 30b is defined, according to which the inclination of the main rotor plain is to be controlled. Upon the inclination, the helicopter would respond with a horizontal acceleration proportional to the inclination. Therefore, the flight velocity would change proportionally to the time integral of the inclination, and the regulation-control-loop is closed.

In order to have the inclination approach the target value, the actuators of the swash-plate 8 are controlled. Since the helicopter does not allow for a control of its inclination directly, but only via the velocity of its change (angular rate), the inclination is not immediately known from the position of the actuators. Therefore, in order to control the inclination, it is advantageous, if an own measurement value thereof is available. In FIG. 5, an inclination sensor 25 is provided for this task, which allows for an own target value comparison 30c. Via a mixer or switcher 23 the result is supplied to the rotor control 8 as control value 26.

As inclination sensor, for example a device according to the cited RU 9300250 may be used. This is imprecise though. Alternatively or additionally, the time integral of the signal of a piezo gyroscope 9, 10, indicating the angular velocity of inclination, may be derived, and thereby, according to the operation of an artificial horizon, represents the rotor's inclination. It is problematic though, that the integration gives rise to an undefined constant of integration, correspondingly to an unknown declination of the horizon. It may stem from the situation in the moment of the switching-on as well as of slight drifts, and would significantly disturb the control.

The inclination may be measured in that a measured signal 24, which is obtained from the optical shift sensor 3, and is proportional to the velocity, is differentiated with respect to time in at least a part of its frequency range. This works, because the helicopter in common flight situations accelerates proportional to its inclination, and the acceleration can be obtained by differentiating the measured velocity.

Resulting from the differential operation applied to the optical measurement signal, which itself is outputted in steps, there may emerge disturbing discontinuities from the incremental steps. The measurement value for the inclination may be created as the combination of both, the measured value, which is obtained from the shift sensor and is differentiated with respect to time, as well as the time integrated signal of a rotational signal, proportional to the angular velocity of the inclination. In this respect, especially the differentiated measurement value's spectral components of higher frequency may be weighted less, and the integrated signal's spectral components of lower frequency and the constant signal component may be weighted less. In this way, the described problems of the integration constant and of the zero point drift are solved, because they cease to exist, if the lower spectral components are taken out, as well as the discontinuities, because they are smoothened by lowering the higher spectral components. The respective missing portions can be replaced by the other signal. The combination resulting to the optical measurement signal by differentiating and low-pass filtering, can, in a synonymic manner, also be represented by and be created as a high-pass of first degree; the combination resulting to the gyro signal by integrating and high-pass filtering, can, in a synonymic manner, also be represented by and created as a low-pass of first degree.

As rotational signal for this regulating control of inclination, there may be used each of the methods described in connection with the rotation compensation, as for example piezo gyroscopes or control value for control. Alternatively to this, or in combination herewith, the rotational signal may again be created as described above.

The regulation-control of the inclination may be combined with the regulation-control of the horizontal movement, in that the described measurement values for inclination as well as for motion (velocity and/or position) are mixed, and thus are regulation-controlled together. The explicit separation of the operations "representation of the measurands" and "regulation-control" was done for the sake of better understanding, but is not essential for the realisation. Generally, proportional, differentiated and possibly integrated portions of the optical measurement signal may be admixed to the regulation-control loop in parallel, what results in that the described regulation-control in its entirety, in a synonymic manner, may be realised in form of a shared PID regulation-control loop.

In using an integral signal branch within the regulation-control loop, a stationary regulation-control is obtained, whereby a hovering flight is stabilised in such a manner, that even subsequent to temporary deviations like disturbances, wind gusts and the like, the original position is reconstituted.

In computing an integral of the shift values, a measured value, which is proportional to position can be obtained. When obtaining the absolute spacial position in ground-based coordinates, the yawing movements can be accounted for in a compensating manner. For this, the incremental sensor signals of both sensor coordinates may be summed up in an integrating manner, wherein, representative for two ground coordinates, two integration sums are to be provided, and wherein, in addition, the alignment of the sensor is measured with respect to a rotational axis perpendicular to the ground coordinates, and the sensor signal increments to be summed up, prior to being summed up, are vectorially rotated under control of the measured heading.

A target value may be provided for a velocity instead of a position. Such a target value may at first be integrated, and then be used as target value for position. The position proportional actual values and target values may also be omitted, and the regulation-control may be confined to velocities. The mixing 30a and integration 28 may be omitted, and the manual control value 22 may be directly supplied to a velocity comparison 30b.

The described regulation-control methods, especially the ones for regulation-controlling the inclination of a helicopter, may also be applied for flight stabilisation without the use of an optical sensor. Thereby, the position proportional actual values and target values may be omitted and the regulation-control be confined to the inclination angle.

Instead of the optical sensor 3 or in combination herewith, any of the navigation systems known from the state of the art may be applied to obtain actual values 28 of the position or the velocity, and thereby to realise the regulation-control method, which is described here. To this end, the described regulation-control method only has to be modified in such a way, that the sensor 3 and the frequency measurement 27 are omitted, and a position measurement value 28 and/or a velocity measurement value, which stems from an alternative measurement system, is employed.

Figure 2:
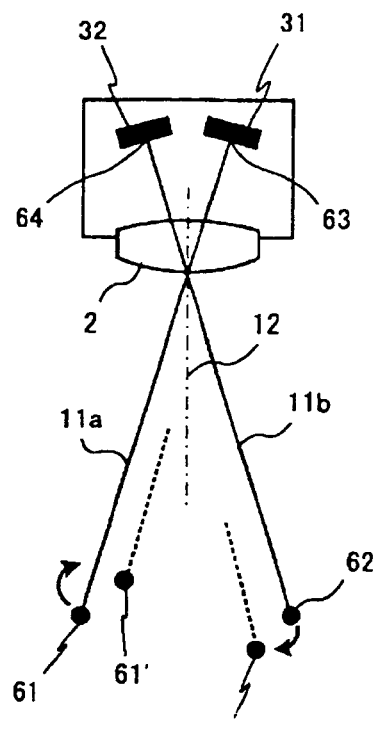
FIG. 2 shows a second embodiment example for measuring and stabilising a rotation about the vertical axis.
Figure 4:
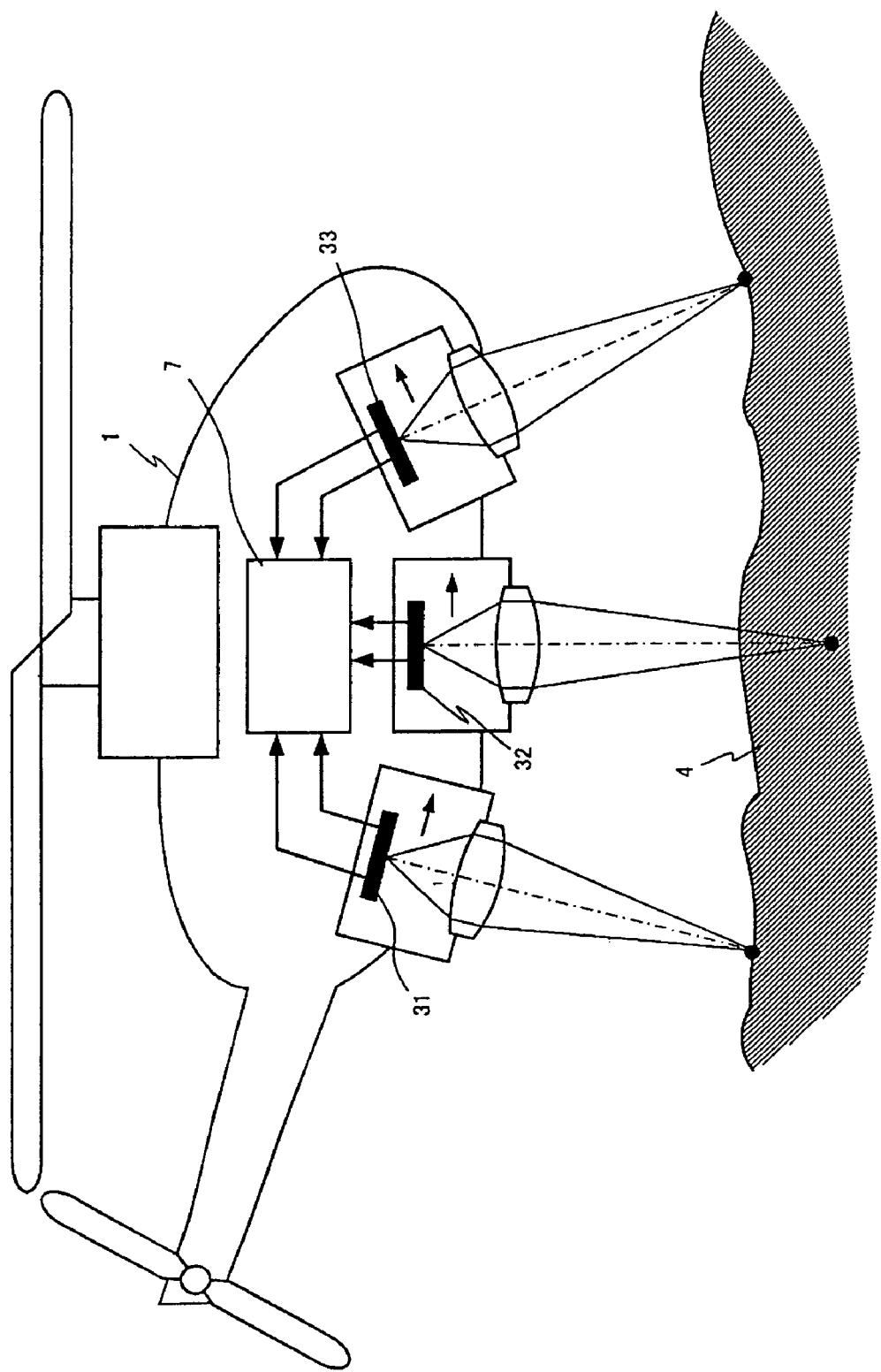
FIG. 4 shows a forth embodiment example for combined measuring of several degrees of freedom.

FIG. 2 shows a second embodiment example: for measuring a rotational movement or rotational velocity, at least two shift sensors 31 and 32 are present. Both sensors, in a dislocated way, may be disposed behind a shared lens 2 or other imaging optical system, or may as well possess own imaging optical systems, as shown in FIG. 4. The thereby resulting arrangement may be a combined device, or may be assembled in separate units. The lines of sight of the different sensors are aligned such that they diverge in predetermined angles. For most applications, acute angles are suited. Therefore, both lines of sight are similar and result in a shared main line of sight, which may be assumed to be the angle's bisecting line. Rotations with respect to an axis in the angle's bisecting line or close to it, result in image shifts of the ground spot's images 61, 62 in tangential direction. Accordingly, the sensors 31, 32 are aligned in such a way that they detect tangential displacements. The tangential displacements measured by both sensors may be related to each other, for example by subtraction, mixing, comparison or generally a superposition of the measurement values of both sensors. In this manner, the tangential portion of the shifts is filtered out, the measurement becomes substantially independent of other movements. The signal comparison may consist of a mixing or generally a superposition. If the individual measurements are weighted differently prior to mixing, the position of the axis of rotation may be changed in a defined way. At the same time, another mixing of the measurement values may give a different measurement value, for example like according to the first embodiment example, whereto a sum of equally directed motion may be utilized. Instead of superposition, any known kind of signal comparison may generally be used.

Figure 3:
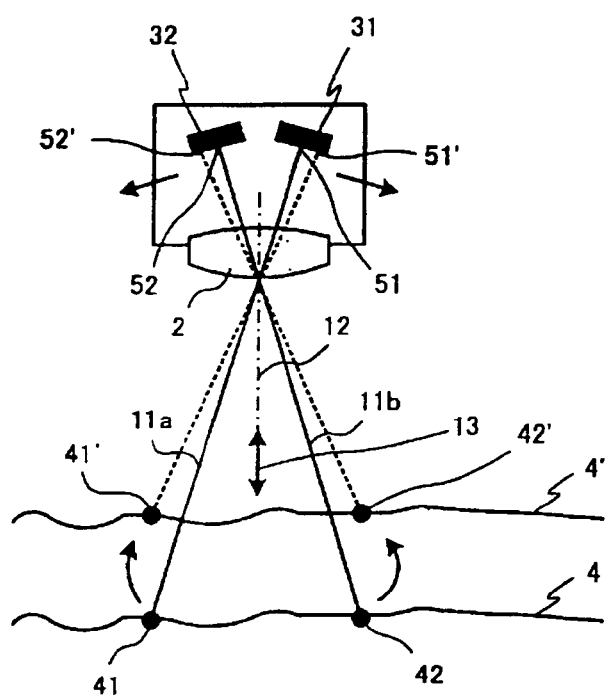
FIG. 3 shows a third embodiment example for measuring a vertical velocity or a distance to an object.

FIG. 3 shows a third embodiment example. It is adapted to be used to measure the distance or change of distance or approach velocity. The arrangement described in FIG. 2 is used, but instead of tangential image shifts, a radial component of the image shift is measured. By means of a subtraction of both sensor signals, or generally a superposition of both measurement values, the radially counter-propagating portion of the shifts is filtered out. When approaching the object or the ground 2, respectively, into position 4', a visible spot 41 migrates into position 41', and its image on the sensor 31 migrates from position 51 in radial direction to 51'. The same is true with respect to sensor 32 for the spots 42, 42' and the images 52, 52'. Due to the beam geometry, the measured angle difference migrates proportional to a change in distance, and inverse proportional to the square of the absolute distance. If the distance is approximately known, therefore can be measured the change, and, starting from the change signal, the longitudinal velocity.

Contrary to the distance measuring described earlier, it is not the absolute value of the distance, what is measured here, but the rate of change. Further, it is not necessary here, that a different velocity be present in transverse direction, and that it be known. If the line of sight is directed vertically, there results the measuring of a rate of declining or rise, respectively.

If, on the other hand, the velocity is approximately known, instead of the velocity, there may be determined the absolute distance by means of the same arrangement. Since the measured value is quadratic to the reciprocal distance, the accuracy of the measured distance is twice as good as the one, up to which the velocity is known. If, for example, the velocity is known only up to ±10%, the measured distance accordingly only varies by 5%.

All described measurement methods for distances or approach velocities may be applied to detect collision, for example to anticipate or avoid the collision.

Besides the sum of the radial shift, there may as well be formed the difference, which means the sum of the equally directed translation. Therefore, transverse movements with respect to the other two axes may be measured simultaneously.

The measurement methods for rotation and approach described with reference to FIGS. 2 and 3 may be combined, in that the measurement values of both coordinates of each of the at least two shift sensors are analysed.

FIG. 4 shows a forth embodiment example. Three sensors 31, 32, 33 are arranged in such a way, that their respective lines of sight are disposed in three different, for example orthogonal directions, wherein each sensor may have 2 directions of measurement. There result up to 6 measurement values. The lines of sight may be orthogonal, but do not need to be. To obtain a flight stabilising, all three lines of sight may be directed at the ground, like the feet of a tripod. The measurement values of the aslant lines of sight, by means of calculation mixing according to a rotational matrix, may easily be transformed into the straight coordinates relevant for control. By means of such an arrangement, there may be obtained an orientation with respect to all six spatial coordinates, and all components of the flight movement may be detected and stabilised. All measured values may be purged for the described influences caused by rotation, in that three independent rotation sensors are provided. The axes of rotation of these sensors may be aligned to the same vector system for the sake of simplicity.

These independent rotation sensors may be obviated though. In order to compensate for a respective one of the sensors 31, 32, 33, the signals of one or both of the remaining sensors are used, wherein these remaining sensors accordingly are used for rotation measurement, and their measured value is used as rotational signal to compensate the first sensor, using a compensation manner described earlier.

Generally, any arbitrary ones of the measurement methods described here may be combined. Further, disturbing effects of a movement related component to the measuring of another motion related component may thereby be eliminated, in that another mixture of movements is measured with another sensor, and in that both signals are subjected to a comparison. Movement related values may be measured in several degrees of freedom independent of each other, even if these degrees of freedom consist of combined movements, i.e. are not separated from each other. Axes of movement or coordinates, respectively, do not necessarily have to be orthogonal to each other. Since each sensor measures another mixture of movement related components, there may be done an un-mixing of the measured values into separate coordinates, in that the measured signals, by means of a suitable mixing according to the laws of vector geometry, are transformed into linearly independent, optionally orthogonal measurement signals.

Generally, an arbitrary number of sensors may be applied, and these may be aligned in differing ways. In addition, in order to analyse the signals of that sensors may be selected, that report a sufficient contrast. Thereby, the probability of insufficient image details is reduced.

For a regulation-control, the described transformation is not compulsory. Generally, spatial coordinates of a movement may be measured and regulation-controlled in mixed form as well. By means of a suitable sensor alignment, the intended mixing may be defined. In case of the helicopter, an optical measuring of rotation may be applied for controlling the tail rotor. Thereby, the line of sight may be directed aslant backwards and downwards. A combination of jaw axis rotation and lateral drift is measured then. In this way, the fuselage aligns itself into the flown direction, independent of wind.

Other flight instruments already commonly used for stabilising may be replaced as well. For example, in case of remote controlled models, the commonly used jaw axis gyro may be replaced by the measurement of rotation. Further, instead of a variometer, an optical measurement of climbing rate according to FIG. 3 may be used.

In combination with commonly used instruments for measuring other motion related components, like for example the flight altitude (barometer) and the nose alignment (compass), a complete autopilot may be realised, which takes over the complete control.

In case of GPS-controlled applications, the accuracy, resolution and speed of the measurement may be substantially improved by supplementing with the optical measurement values, especially in the range close to ground.

If illumination or contrasts from/of the ambiance are insufficient, the sensor signal may be erroneous. Such errors mostly express themselves in form of shift values having a magnitude that is too small or completely missing, and which mostly occur locally, i.e. at singular locations. In order to increase the number of utilisable image locations, and to decrease dropouts, several sensors having different lines of sight may be provided, as already explained with reference to FIG. 2, 3 or 4, to analyse the relations of the sensor signals with respect to one another. Thereby, a shared measurement result may be created, in which sensors having a smaller measurement value are not weighted, or are weighted less. The term "smaller" may refer to the magnitude of the shift measurement value from one or several coordinates, and/or to a measured value, being outputted by the shift sensor, of the actual brightness and/or quality of contrast of the respective sensor. The quality of contrast can be determined and output by each single sensor separately. The shared measurement value may, for example, be created by means of maximal value formulation, by means of weighted average formulation or by means of a switching to the respective strongest sensor. Advantageously the detection precision is increased as compared to a single sensor, since several sensors always complement one another if the contrast is insufficient.

From a plurality of shift sensors, an array may be created, and the sensors may be connected with each other in a matrix net form, wherein the weighted result described here may be formed. Further, a combination with signal analysis methods described with reference to FIGS. 2, 3 and 4 is possible. This allows for a thorough analysis of the movements, which is far superior to a method based on analysis of a video signal, as far as speed is concerned.

In order to avoid control errors, which might result in a disturbance of measurement, independently from the above named methods, or in combination therewith, in case the measurement signal is omitted, the regulation-control might be switched into another mode, in which no optical measurement signal is needed. The switching may be controlled by the absence of the measurement signal and/or the falling below a minimal contrast value and/or a minimal brightness. The switching of the regulating control may be effected, in that the weighting portions for the mixing of the actual values and measurement values participating in the mixing and the regulation-control may be reorganised in a suitable way, for example to a configuration, as it is known from the state of the art, without shift sensor, until the optical signal is again sufficiently present.

In a simple special case thereof, the rotor inclination can be held horizontal, while the measurement signal is missing.

An apparatus according to the described manner, or the manner described in the claims, may generally be used also for detecting or measuring relative movements between the device and an object of any kind distantly disposed thereto (in measuring the change of angle of the direction of optical inclination of a virtual image), whereby on the one hand, the optically sampled object may be moving, and/or on the other hand, as in the described case of the airborne object, that object or any body carrying the sensor device can move. Since a scanned object may move, the device may be mounted fixed and unmovable. The sensor can drive a machine control. Generally, it is only necessary that at least the chip of an opto-electronic shift sensor 3 provided with a plurality of photosensitive partial areas (pixel) and detecting shifts of optical structures, and outputting a measurement signal for the shift, and for this containing an analysing unit integrated on its chip, is combined with an imaging optical system 1, and located such that optical structures of infinitely distant objects are imaged onto the light sensitive area of the sensor with a resolution sufficient for detecting an image shift. The sensor chip can be of the sort commonly used at optical mice, or of identical structure. As illumination, there may serve the ambient light. The contrasts necessary for shift-scanning may arise from the surface of the imaged object, or from the contours of one or several object(s) with respect to a background.

In contrary to the operation of an optical mouse, the object may be smaller than the optical capturing range of the device, wherein this range is determined by the size of the light sensitive sensor area, the focal length and the scanning distance. The object may be transilluminated by the light necessary for scanning.

Here is a list of the applications possible therewith, when the scanned object is moving: An application is the detecting of the presence of moving objects, for example for automatic opening of gates for driving-in vehicles or entering persons, wherein in contrary to known optical sensors like photoelectric relays or light baffles, there is no restriction in the range of coverage. If the background is unstructured, the detected object may be substantially smaller than the optical detection range, which is determined by the size of the light sensitive sensor area.

A further modification is the non-contacting measurement of velocities or rotations of moving objects or the measurement of the distance to moving objects. For example, the sensor may be directed to the transported material positioned on a conveyor belt. If the transport speed is known, from the optically measured shifting velocity, there may be obtained a measurement value for the height of the transported material, in that its reciprocal value is formed.

Further, continuous materials may be analysed with respect to freedom of error. Depending on the state of the surface and on the illumination, an error can be detected as a detected structure or as a missing structure as well. Contrary to commonly used imaging systems, a substantial saving in costs is possible.

Further, the velocity of liquids or gases can be measured on account of the floating particles carried along.

A further application is, to have a visual representation, as for example of a display window, be dependent on the movement of a viewer. To this end, the viewer is optically scanned by means of the device. In that the face of a viewer is scanned, the problem of tracing (head tracking) known in connection with 3D image presentations, may be solved in a cost-effective way. The measurement signal of the shift sensor may be used as a measure of the shift of the head and/or the actual eye position. This signal may both, control the perspective of viewing of an image to be seen by a viewer, so that it corresponds to the head movement of the viewer, as well as control the exit direction of the exit pupils, being provided for separate eyes in case of a stereo-optical image representation, in order to obtain an entering into the correctly assigned eyes, also in case of head movements.

In addition to the shift signals of the sensors, further measurement signals obtained from the sensor, like an illumination value or a contrast quality value may be analysed as well. This is advantageous in detecting transported material and in controlling machines.

Applications in case of moved sensor device: for robots and vehicles, also self-steering, namely for automatic steering by means of a regulation-control loop, as well as for distance detection and avoiding of collision. In this case as well, the movement may selectively be quantitatively measured, or only the presence of an object be detected, as for example a barrier. In case of lateral line of sight, the lateral distance, as for example with respect to a wall, may be measured and regulation-controlled. Thereby, as actuator, the steering may be controlled, and allows for a driving along a barrier.

Instead of implementing the methods disclosed in the present application by means of electronic circuits only, said methods may also be carried out at least in part by software executed on a computer system and operable to perform at least some of the method steps.

What is claimed is:

1. Optical sensing system for measuring the movement and/or the position of a vehicle which is machine-controllable or equipped with a drive mechanism, in at least one of its six spatial degrees of freedom, wherein the system comprises an optical imaging means provided on board with the vehicle and suitable for projecting an image section of a surrounding into an image plane; an opto-electronical shift sensor of the type equipped with a plurality of photosensitive partial areas (pixels) and, arranged on a same common substrate, with a digital and clocked electronic evaluation circuit for detecting the shift of a pixel image and for outputting a measurement signal for the shift; wherein the optical imaging means is adapted and arranged such that infinitely remote structures are projected onto the shift sensor.

2. System according to claim 1, wherein at least the chip of a sensor designated for optical mice, or a chip which is equal in structure to this, is used as shift sensor.

3. System according to claim 1, wherein the shift sensor is provided with an output for outputting measurement values of the shift in the form of incremental shift values or shift jumps.

4. System according to claim 1, wherein the shift sensor has less than 1500 pixels and wherein the read-out rate of the pixels and the evaluation rate are higher than 120 Hz.

5. System according to claim 1, further comprising an electronic device suitable adapted for obtaining in an electronic evaluation process at least one of the following measurement quantities from the output signals of at least one measurement coordinate given by the shift sensor: degree of shift by summation of incremental shifts, velocity of the measured shift, rate of change of velocity, event of a measured movement.

6. System according to claim 5, wherein the further electronic device is suitably adapted for transforming the measurement signals output by the shift sensor into a measurement value for the velocity of the measured shift, in that said electronic device measures a frequency of the shift increments or shift jumps output by the shift sensor, taking into account the direction of the shift as leading sign.

7. System according to claim 1, wherein an electronic (control) device is provided for generating a control value out of an actual value derived from the measurement signal of the shift sensor, wherein the electronic (control) device is connected to actuating elements which control an airborne object for stabilizing the flight of the airborne object.

8. System according to claim 1, wherein the systems comprises at least one gyroscope and an electronic circuit adapted for compensation mixing of signals derived from the gyroscope and the shift sensor.

9. System according to claim 1, wherein the system is included in an airborne object, in particular a helicopter or another rotorcraft.

10. System according to claim 7, wherein the system further comprises a feedback loop which uses an opto-electronically generated measurement value output by the shift sensor, at least in part as an actual value, and generates a control value from the measurement value, wherein the control value is defined proportional and opposed to a velocity deviation, and controls at least a roll movement.

11. System according to claim 10, wherein a roll inclination angle is controlled by means of a feedback loop.

12. System according to claim 1, wherein at least two shift sensors are used, and are directed such that their main lines of sight resulting from the optical imaging are divergent by a predetermined angle, and in that the signals of the sensors are analysed in relation to each other.

13. System for controlling at least a roll attitude for stabilizing hovering flight of an airborne object, wherein an opto-electronical sensing means is provided for obtaining an optical flow measurement signal from a section of a ground image, the system comprising an electronic circuit adapted for generating from the optical flow signal of at least a lateral movement direction, at least in part, a control signal in the manner of a negative feedback loop, the generated control signal being adapted for driving an actuating element affecting roll movements of the airborne object.

14. System according to claim 13, wherein the optical line of sight of the imaging has an essential vertical component directed downwards, and wherein the control signal is defined as proportional and opposed to a velocity deviation in a manner of comparison of actual value and target value.

15. System according to claim 13, wherein the measurement signal is purged from effects resulting from rotational movements like rolling and/or pitching of the vehicle at least in part, by compensation mixing of a rotation signal signalling an angle or an angular velocity of a rotational measurand, with the measurement signal.

16. System according to claim 13, wherein a combination is obtained of a measurement signal from an optical flow sensor that is differentiated with regard to time in at least a part of it's frequency range, and a rotation signal proportional to the angular velocity of the inclination that is integrated with regard to time in at least a part of it's frequency range.

17. System according to claim 13, wherein the feedback loop combines the control of the inclination and the control of the horizontal movement by mixing and jointly controlling measurement quantities for inclination or inclination rate, and for horizontal movement and/or position.

18. System according to claim 13, wherein at least one gyroscope and an electronic circuit are provided which are adapted for compensation mixing of signals derived from the gyroscope and the shift sensor.

19. Method for measuring the movement and/or the position of a vehicle, which is machine-controllable or equipped with a drive mechanism, in at least one of its six spatial degrees of freedom, using optical sensor technology, characterized by the following steps: an image section of the surroundings which can be viewed from the actual position is captured by means of an optical imaging means on board with the vehicle and projected onto the photosensitive area of an opto-electronical shift sensor comprising on a common substrate a plurality of photosensitive partial areas and a digital and clocked electronic evaluation circuit for detecting the shift of the image of projected structures and for outputting a measurement signal for the shift and positioned optically behind the optical imaging means at a place where the optical resolution of image structures at infinity is sufficient for the detection of shift; measurement data of the photosensitive partial areas are supplied to the electronic evaluation circuit; within the electronic evaluation circuit changes resulting from shifts of the structures are evaluated by continuous comparison with previous measurement data and a measurement signal for the shift is generated, which is output as an output signal and used as measure for at least one position and/or movement quantity of the vehicle.

* * * * *